United States Patent [19]

Kadaja

[11] Patent Number: 5,346,234
[45] Date of Patent: Sep. 13, 1994

[54] VEHICLE INCLUDING AN HYDRAULIC DRIVE MECHANISM

[75] Inventor: Thomas P. Kadaja, Eugene, Oreg.

[73] Assignees: Robert D. McCay, Jr., Creswell; Wallace A. Sprenger, Harrisburg, both of Oreg.; Kwangsook Chung, Seoul, Rep. of Korea; Kevin M. Hughes; Karna M. Hughes, both of Eugene, Oreg.

[21] Appl. No.: 797,062

[22] Filed: Nov. 25, 1991

[51] Int. Cl.$^5$ ............................................. B62M 1/10
[52] U.S. Cl. ................................ 280/216; 280/259; 280/282; 418/266
[58] Field of Search ............... 280/214, 216, 259, 282; 92/60.5; 418/145, 266

[56] References Cited

U.S. PATENT DOCUMENTS

| | | | |
|---|---|---|---|
| 762,539 | 6/1904 | Leiman et al. | 418/266 |
| 1,414,028 | 4/1922 | Leiman | 418/266 |
| 1,453,683 | 5/1923 | Kochendarfer | 418/145 X |
| 2,793,876 | 5/1957 | Allwes | 280/216 |
| 4,688,815 | 8/1987 | Smith | 280/216 |
| 4,852,898 | 8/1989 | Donoghue et al. | 280/216 |

FOREIGN PATENT DOCUMENTS 516318  12/1939  United Kingdom ............... 280/216

*Primary Examiner*—David M. Mitchell
*Assistant Examiner*—Andrew C. Pike
*Attorney, Agent, or Firm*—Chernoff, Vilhauer, McClung & Stenzel

[57] ABSTRACT

An hydraulic drive mechanism for tricycles and the like comprises a variable volume, positive displacement hydraulic pump and a hydraulic motor. The pump is dual chambered with each chamber operating a separate hydraulic system for separate drive wheels. Each chamber has three curved pivoting vanes around a central crankshaft. Each chamber also has two reservoirs which momentarily store hydraulic fluid. This temporary storage of fluid changes the volume output of the pump. Changes in pump volume output change drive ratios. The amount of fluid stored is controlled by the operator. Consequently, the drive mechanism changes drive ratios hydraulically. Also, the pivoting vanes in each chamber can be forced down by back pressure. This back pressure is generated by the hydraulic motor on each rear wheel. During cornering the outer radius wheel will rotate faster than the inner wheel and consequently will drive the hydraulic motor and generate back pressure and that pushes down the vanes. This feature allows the drive mechanism to function like a car with a differential gearbox for safe cornering.

14 Claims, 10 Drawing Sheets

VEHICLE INCLUDING AN HYDRAULIC DRIVE MECHANISM

BACKGROUND

1. Field of the Invention

This invention relates to hydraulic operated tricycles, specifically, an improved hydraulic pump for this tricycle.

2. Prior Art

This invention addresses the fundamental problem of making our nation less dependent on petroleum products and the car. Our nation uses 2-6% of our total energy on short distance automobile trips. The reason people use their cars for these short trips is that they have no alternative way to transport themselves and their cargo.

A bicycle is an inferior method of carrying cargo, e.g., like two bags of groceries home from the neighborhood supermarket. The bicycle is unstable, has limited cargo carrying capacity, and it is difficult to operate.

The best design for a human powered cargo carrying vehicle is a tricycle/pedicab. The present pedicab has problems which stem from the ancient chain and sprocket drive system. The major problem of this drive system is that it does not provide for a differential. A differential is necessary for cornering. When a differential is added to the chain and sprocket pedicab, it becomes too heavy or too expensive.

Other problems are that the chain and sprocket system limits the placement of the foot pedals. The chain and sprocket system requires the foot pedals to be close to the drive axle. Also chain and sprocket systems are difficult to shift and they require constant maintenance.

OBJECTS AND ADVANTAGES

Accordingly, several objects and advantages of the present invention are:

(a) to provide an improved hydraulic drive system to the pedicab and other applications;

(b) to provide a hydraulic drive system which provides a wide selection of easily changeable drive ratios; and (c) to provide a positive and predictable hydraulic drive to the two rear wheels of the pedicab, i.e., like an automobile differential with positive traction.

Further objects and advantages are to prove a hydraulic drive system which is relatively maintenance free and which allows pedal placement at a comfortable location. Still further objects and advantages will become apparent from a consideration of the ensuing description and drawings.

DRAWING FIGURES

In the drawings, closely related figures (parts) have the same number but different alphabetical suffixes. All drawings relate to the variable volume positive displacement hydraulic pump which will be referred to as, pump 18.

DETAILED DESCRIPTION OF A PREFERRED EMBODIMENT OF THE PRESENT INVENTION

Exterior Views

Figure 10:
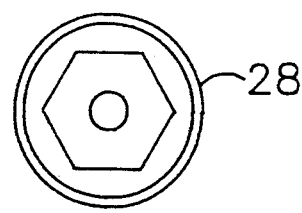
FIG. 10 is a top view of a limiter nut.

A typical embodiment of the present invention is illustrated in FIG. 10. A variable volume positive displacement hydraulic pump, pump 18 is mounted to the frame 2. Pump 18 can be mounted at any desired location and can be used on any multi-wheeled bicycle. A control mechanism 4 operates a transmission function of the pump as will be explained below.

Figure 2:
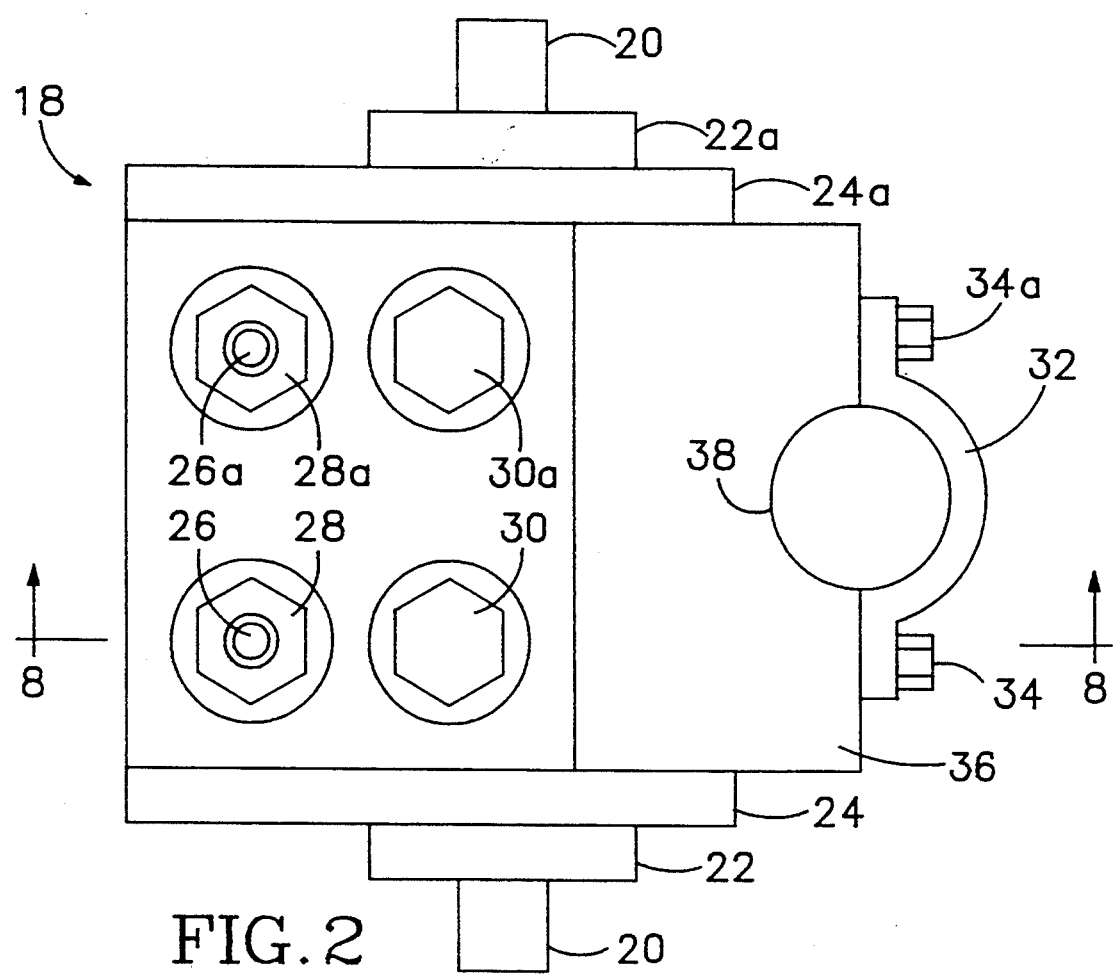
FIG. 2 is a top view of a preferred embodiment of the pump 18 of the present invention.

FIG. 2 illustrates how case 36 can be attached to a tubular frame. If case 36 is made from a material which allows brazing, the tubular frame can be directly brazed to frame cut-out 38. Case 36 can also be made from aluminum, ceramics, or from plastic which has been injection molded. Then frame cut-out 38 and frame clamp 32 can be used to grip the tubular frame. Frame clamp 32 is secured with clamp bolts 34, 34a, 34b, 34c which are standard type bolts. Clamp bolts 34, 34a, 34b, 34c are threaded into case 36.

Because pump 18 has two identical chambers 50, 50a, there is a duplication of components. FIG. 2 illustrates the top exterior view of chambers 50, 50a. Limiter 26, limiter nut 28, and reservoir cap 30 belong to chamber 50. Limiter 26a, limiter nut 28a, and reservoir cap 30a belong to chamber 50a. Limiters 26, 26a are centrally positioned and threaded into limiter nuts 28, 28a. Limiter nuts 28, 28a and reservoir caps 30, 30a are threaded into case 36.

Each side of case 36 has an end plate 24, 24a. End plates 24, 24a are similar. Bearing flanges 22, 22a are part of end plates 24, 24a. The ends of crankshaft 20 are used for mounting foot pedals.

Figure 3:
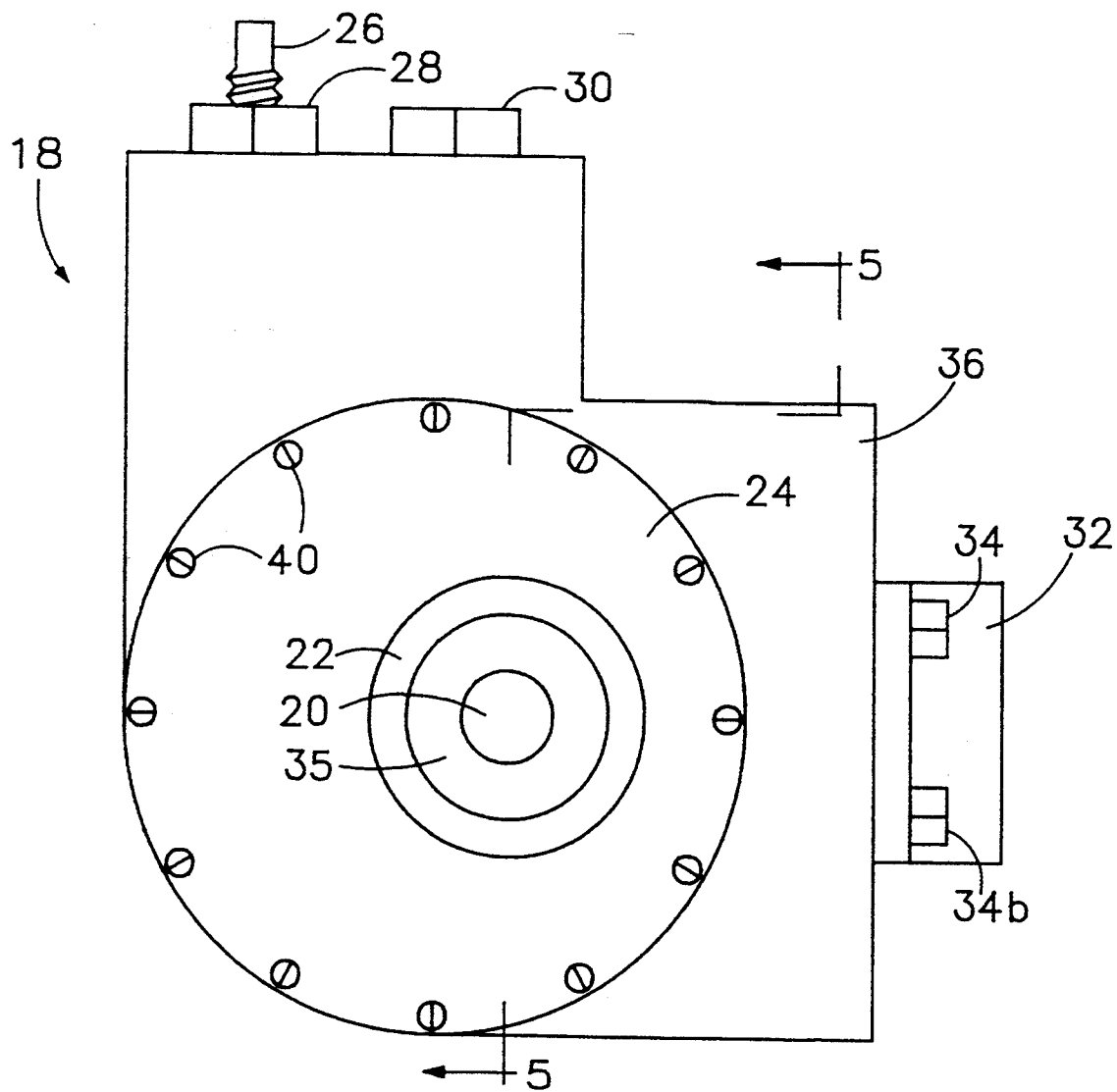
FIG. 3 is a side view of the pump 18.

FIG. 3 is a side exterior view, of pump 18. Both sides are similar and utilize similar parts. FIG. 3 illustrates how end plate 24 is attached to case 36 by twelve bevel headed, machine screws 40. Also illustrated is how crankshaft 20 is allowed to rotate by bearing 35. Crankshaft 20 is positioned by bearing 35 which is secured by bearing flange 22 which is part of end plate 24.

The exposed end of limiter 26 is used for attaching control mechanism 4. This control mechanism will be used for rotating limiter 26. FIG. 3 also illustrates the side profile of frame clamp 32 and clamp bolts 34, 34b.

Figure 4:
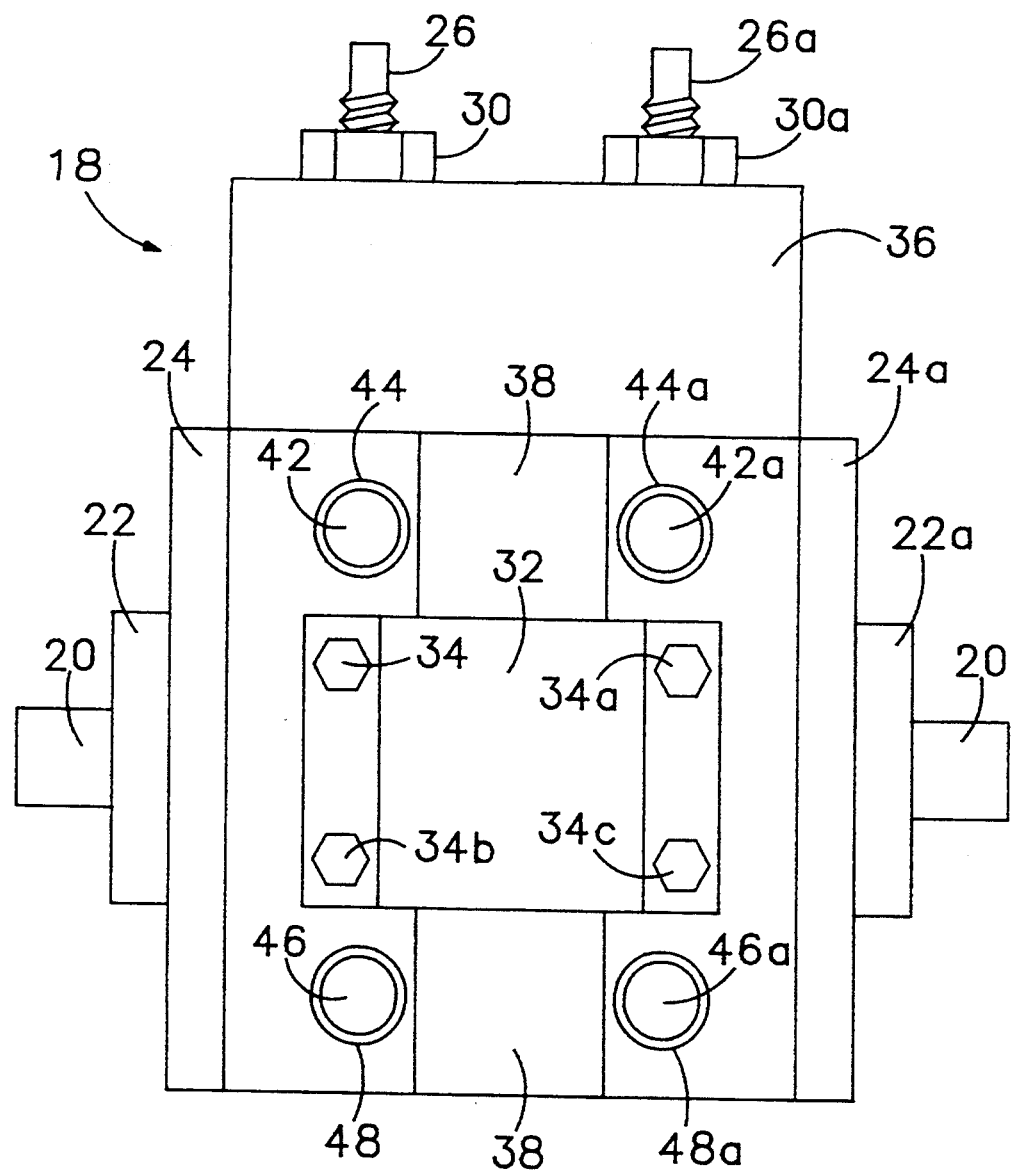
FIG. 4 is the end view of the pump 18.

FIG. 4 illustrates the exterior end view of pump 18. This view illustrates how frame cut-out 38 runs the length of case 36. Also illustrated are frame clamp 32 and clamp bolts 34, 34a, 34b, 34c.

Inlet 42 and outlet 46 are passages to chamber 50. Inlet 42a and outlet 46a are passages to chamber 50a. Inlets 42, 42a and outlets 46, 46a allow the passage of hydraulic fluid through pump 18. The frame tubing 2 is inserted into case 36 at inlet tubing insert 44, 44a and outlet tubing insert 48, 48a. Then the frame tubing is brazed to case 36 at inlet and outlet tubing inserts 44, 44a, 48, 48a. If brazing is not possible, the frame tubing will be connected to case 36 via threaded hardware.

Sectional Views

Figure 5:
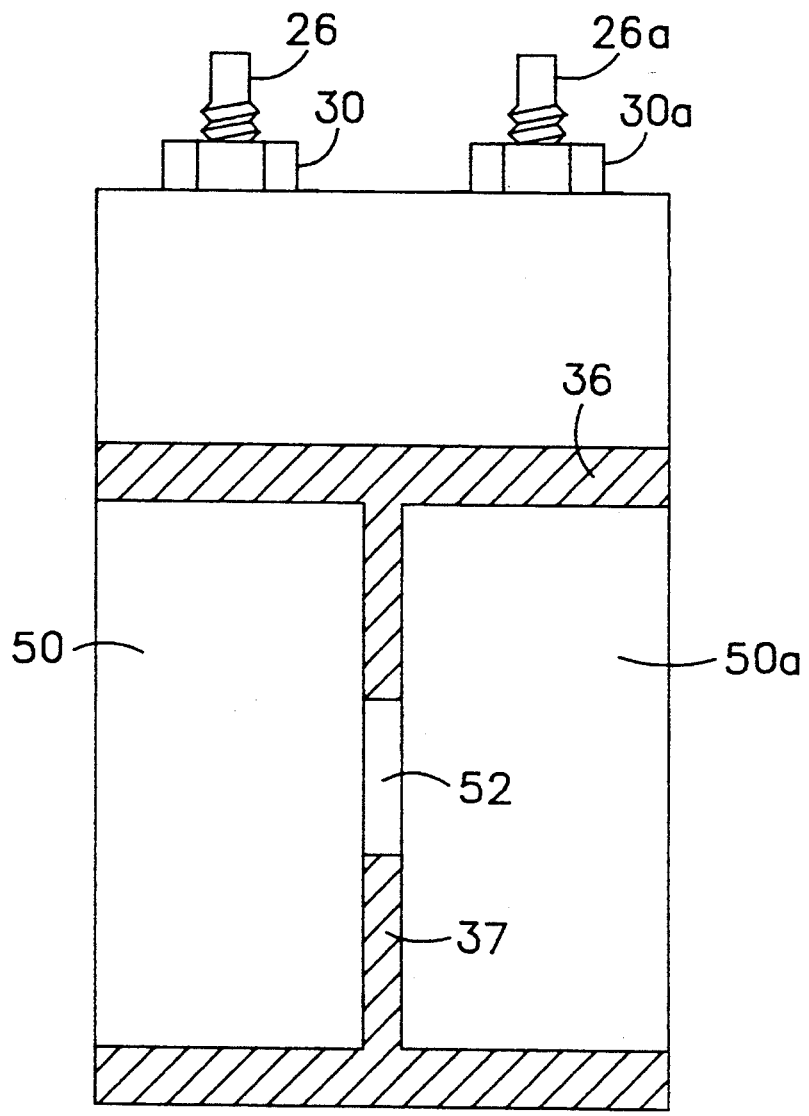
FIG. 5 is a partial sectional end view of case 36 as indicated by the section line 5—5 in FIG. 3 shown without components.

FIG. 5 illustrates case 36 with two similar cylindrical chambers 50, 50a. Chambers 50 and 50a are separated by partition 37. Crankshaft 20 passes through partition 37 at crankshaft hole 52. Crankshaft hole 52 is slightly larger in diameter (approx 0.1 inch) than the diameter of crankshaft 20.

Figures 6, 7:
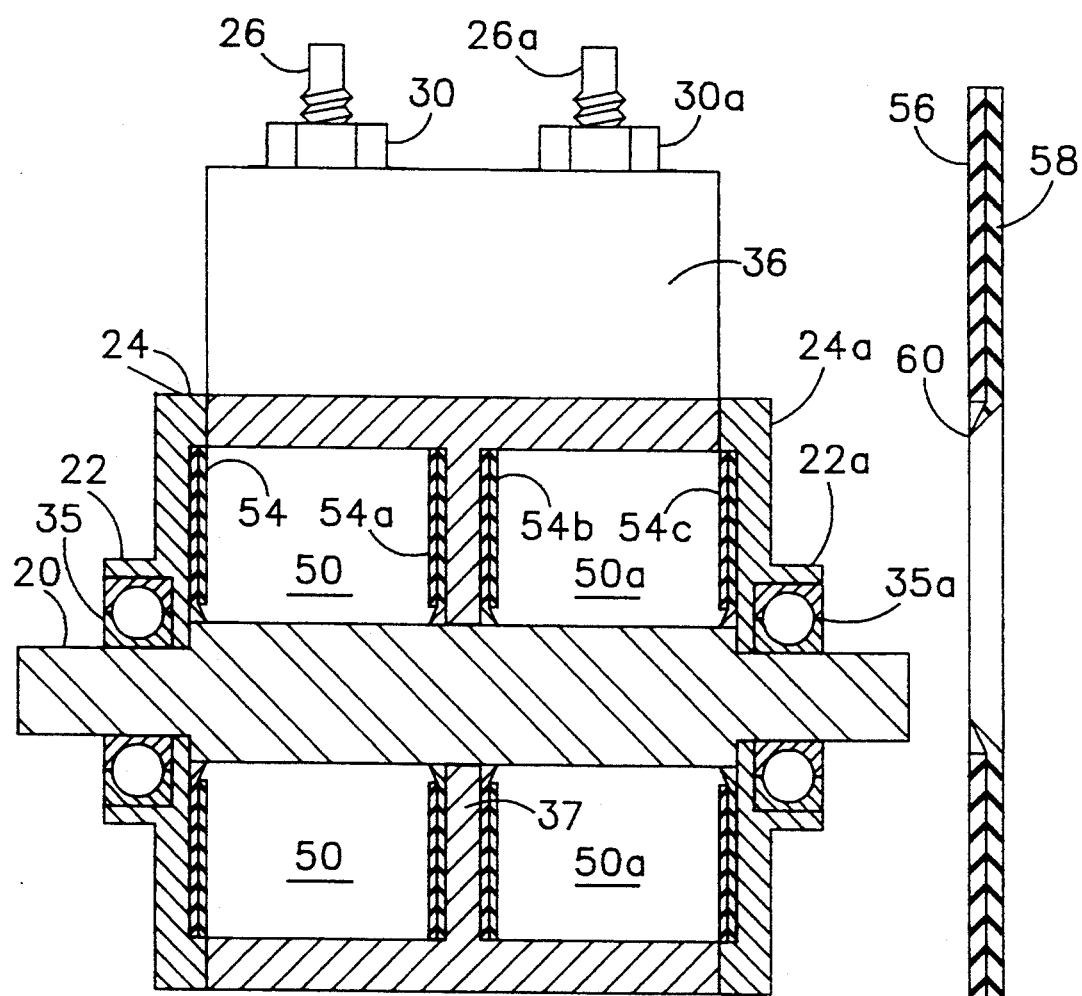
FIG. 6 is a partial sectional end view of the pump of the present invention taken along line 5—5 in FIG. 3.
FIG. 7 is a sectional detail of the interior seal(s).

FIG. 6 illustrates how crankshaft 20 transverses pump 18 side to side. End plates 24, 24a position crankshaft 20. Bearing 35, 35a are held in place by bearing flanges 22, 22a. Chamber 50 has end seal assemblies 54, 54a and chamber 50a has end seal assemblies 54b, 54c. End seal assemblies 54, 54a, 54b, 54c are similar.

FIG. 7 illustrates end seal assemblies 54, 54a, 54b, 54c. This sectional view is two times normal size. The first component part of all end seal assemblies 54, 54a, 54b, 54c is sealing surface 56. Sealing surface 56 is a flat circular disc with a cut-out to accommodate crankshaft 20. Sealing surface 56 can be made from metal or ceramics but because it must be rigid and flat, silicon carbide is the best choice.

Behind sealing surface 56 is the second component of end seal assemblies 54, 54a, 54b, 54c, i.e., cushion 58. Cushion 58 is made from rubber or other slightly compressible materials. Cushion 58 is uniformly thick and adhered to sealing surface 56. Seal 60 is the last component of all end seal assemblies 54, 54a, 54b, 54c. Seal 60 can also be made from the rubber which makes up cushion 58. Seal 60 prevents the leakage of hydraulic fluids along crankshaft 20.

Figure 8:
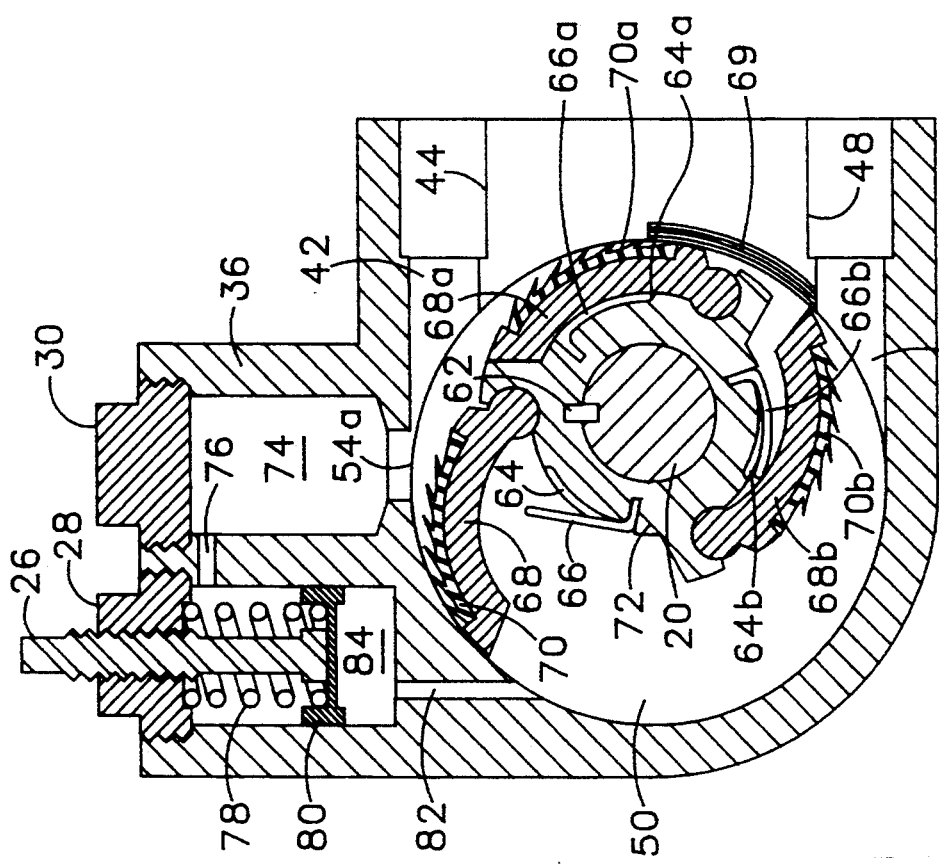
FIG. 8 is a side sectional view of pump 18 at the portion indicated by the section lines 8—8 in FIG. 2.

FIG. 8 is a side sectional view of pump 18 at the midpoint of chamber 50. The components utilized by chamber 50 and chamber 50a are similar. Vane body 72 is attached to crankshaft 20 by key 62. Vane body 72 inner radius is slightly larger than the radius of crankshaft 20. This slight looseness (0.002-0.004 inch) allows vane body 72 to slide side to side on crankshaft 20.

In mid-length of vane body 72 is slot 64. Slot 64 consists of a hole and a groove cut into vane body 72. Vane springs 66, 66a, 66b fit into their respective slots 64, 64a, 64b. Vanes 68, 68a, 68b are closed when they are adjacent to vane body 72. Vane 68a illustrates the closed position.

In mid-length of chamber 50 is vane fluid passage 69. Vane fluid passage 69 is a groove in the curved surface of chamber 50. Vane fluid passage 69 allows the trapped hydraulic fluid to drain so vanes 68, 68a, 68b can close.

Vane body 72 has vanes 68, 68a, 68b. Each vane 68, 68a, 68b has its respective vane seals 70, 70a, 70b. Vane seals 70, 70a, 70b are made from a flexible material, as rubber or plastic and have angled ridges on their outer radii.

Crankshaft 20 positions vane body 72 and its components against the curved wall of chamber 50. This placement is between inlet 42 and outlet 46, at the 3 o'clock position. This positioning provides minimal sealing and vane seals 70, 70a, 70b provide the final seal.

Reservoir 74 is connected to hydraulic lines 75 of pump 18 and provides a cavity for the storage of hydraulic fluid. Preferably, hydraulic lines 75 are the frame tubes 2. Reservoir cap 30 covers reservoir 74. Vent 76 is a passage between reservoir 74 and cylindrical bore 84.

Piston 80 is fitted to and moves up and down in cylindrical bore 84. Piston 80 is tensioned by spring 78. Limiter nut 28 tensions spring 78. Limiter nut 28 positions limiter 26 to the center of piston 80. Fluid passage 82 is a hole which runs from cylindrical bore 84 to chamber 50.

Figure 9:
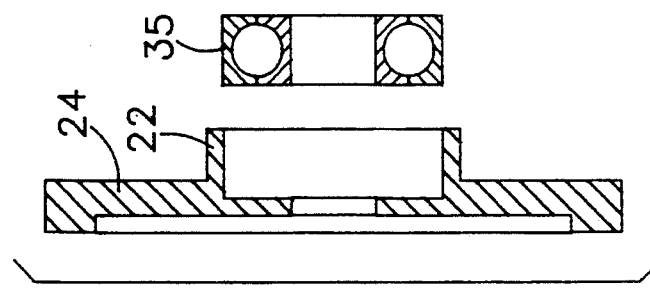
FIG. 9 is a sectional view of an end plate.

FIG. 9 is a side sectional of either end plate 24, 24a. The interior side of end plate 24 has a cut out section to provide a tight fit for end seal assembly 54. The exterior side of end plate 24 has a cut out section to provide a tight fit for bearing 35. Another function of end plate 24, 24a is to maintain hydraulic pressure. End plate 24, 24a may utilize o-rings for pressure sealing. Also end plate 24, 24a allows pump 18 to be assembled. The smaller diameter section of crankshaft 20 fits through end plate 24. Bearing 35 is a standard type ball bearing.

Pump Components

Figure 10A:
FIG. 10a is an elevation view of the limiter nut of FIG. 10.
Figure 10B:
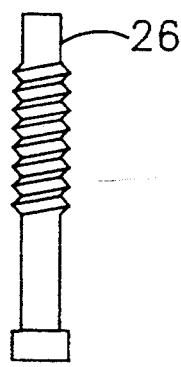
FIG. 10b is an elevation view of a limiter.
Figure 10C:
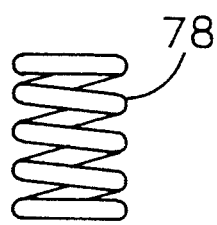
FIG. 10c is an elevation view of a biasing spring.
Figure 10D:
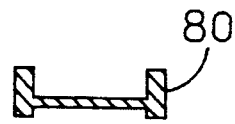
FIG. 10d is a cross-section view of a piston.

FIGS. 10-10d show the component parts used in pump 18 for hydraulic fluid volume control. FIG. 10 shows limiter nut 28 from the top view. This view illustrates that limiter nut 28 has a centrally located hole which is threaded to accommodate limiter 26. FIG. 10a shows limiter nut 28 in a side profile. Limiter nut 28 is made from metal and has a standard type thread with a standard type hex head. Limiter nut 28 threads into case 36 and provides the necessary sealing (with a gasket if necessary) to prevent hydraulic fluid leakage.

Limiter 26, shown in FIG. 10b, is also made of metal and threads into limiter nut 28. Limiter 26 is a metallic rod with one end flared. The mid-length of limiter 26 is threaded to fit into limiter nut 28. The other end of limiter 26 is made to accommodate the control mechanism 4.

Spring 78 is a conventional wire wound spring as shown in FIG. 10c.

FIG. 10d shows piston 80 which is made from metal or plastic and has a close tolerance fit in cylindrical bore 84. Piston 80 is cylindrical in shape and has a cylindrical volume removed from each end. Piston 80 will utilize a seal if needed to maintain hydraulic pressure.

Figure 11:
FIG. 11 is an elevation view of a key.
Figure 11A:
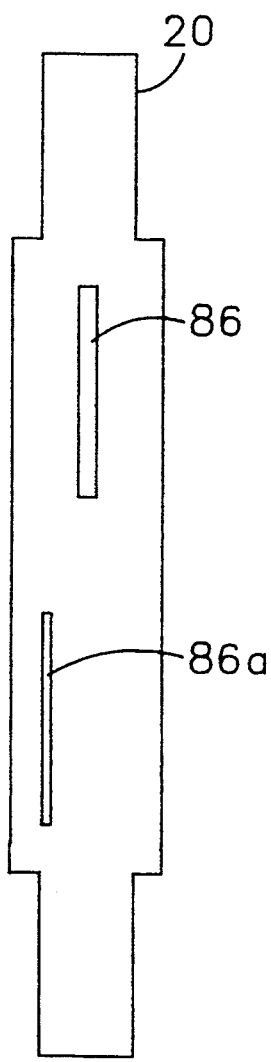
FIG. 11a is a plan view of a crankshaft.

FIGS. 11-11a show the components associated with crankshaft 20. Crankshaft 20 uses two key(s) 62, 62a and both are similar. Key 62, 62a fit into crankshaft key slots 86, 86a. Crankshaft key slots 86, 86a are 60 degrees apart. Crankshaft key slot 86 holds vane body 72 which is located in chamber 50. Crankshaft key slot 86a holds similar components located in chamber 50a. Crankshaft 20 is made of metal. Crankshaft 20 is cylindrical in shape with a central diameter larger than the end diameters.

Figures 12, 12A:
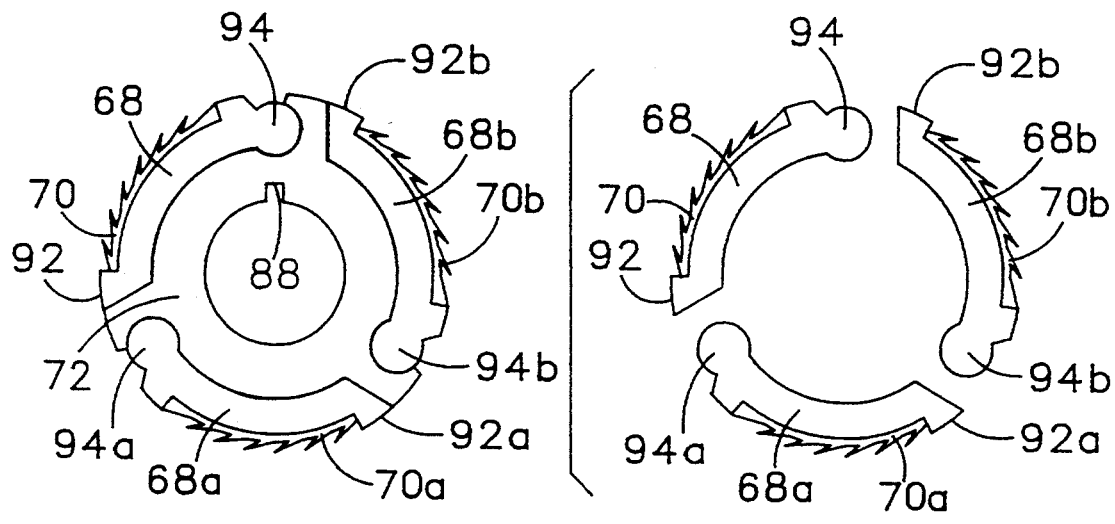
FIG. 12 is an elevation view of a vane assembly.
FIG. 12a is an elevation view of three vanes.
Figure 12B:
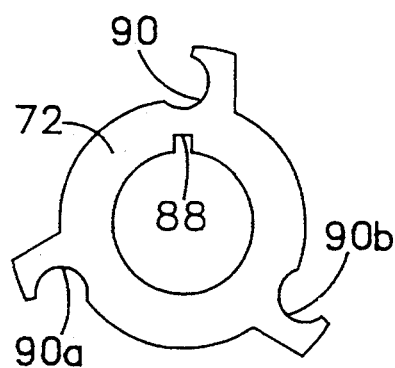
FIG. 12b is an elevation view of a vane body.
Figure 12C:
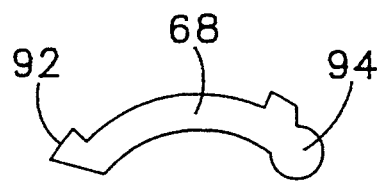
FIG. 12c is an elevation view of a vane without a vane seal.
Figure 12D:
FIG. 12d is an elevation view of a vane seal.
Figure 12E:
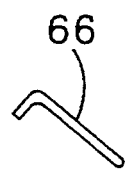
FIG. 12e is an elevation view of a vane spring.
Figure 13:
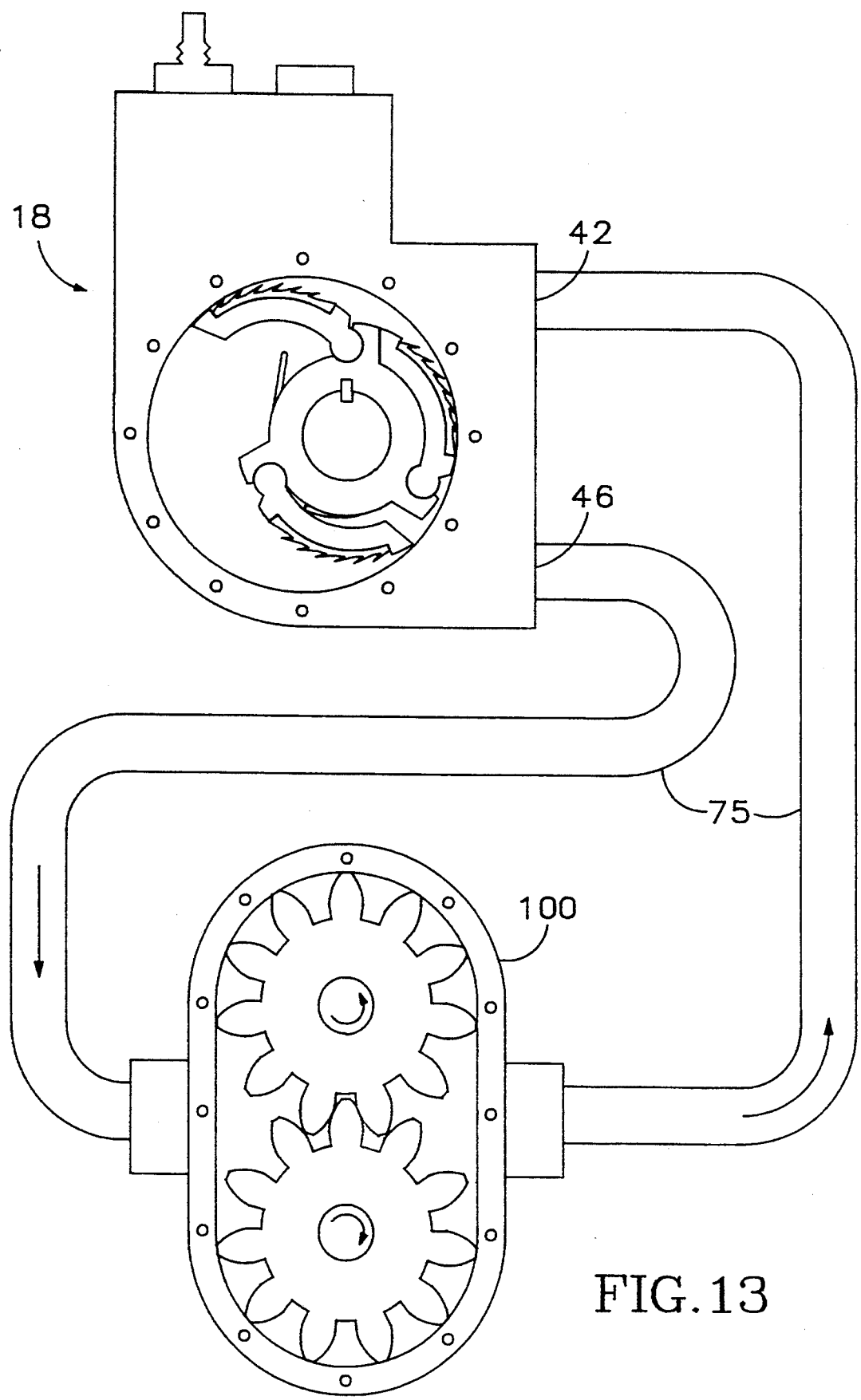
FIG. 13 is a schematic view of the pump and hydraulic motor of the present invention.

FIGS. 12-12e show the hydraulic pump components of pump 18. These pump components are similar for either chamber 50 or chamber 50a. FIG. 12 is an end view of vane body 72, vane body key slot 88, vanes 68, 68a, 68b and their respective vane seals 70, 70a, 70b.

Vane body 72 and its attached components can be made into solids by extruding the end view. All of these components are the same length. This length is determined by the distance between end seal assemblies 54, 54a, 54b, 54c in chamber 50, 50a.

This length is several thousands of an inch longer than the distance between the end seals assembly 54, 54a or 54b, 54c of either chamber 50 or 50a. This extra length causes cushion 58 to be compressed. This removes any space between sealing surface 56 and vane body 72, vane 68, 68a, 68b and their respective vane seals 70, 70a, 70b.

Vane body 72 and closed vanes 68, 68a, 68b form a cylinder. The removal of vanes 68, 68a, 68b from this cylinder form vane body 72. Vanes 68, 68a, 68b can be considered as sections of pipe. This section of pipe has a length and covers about 100 degrees of arc. One flat side of this pipe section has a pivot. This pivot is like a rod attached to the pipe section. The other flat side has vane leading edge 92. This end of the pipe is cut with an angle. This cut angle allows vane 68 to close.

FIG. 12a shows vanes 68, 68a, 68b and their respective vane seals 70, 70a, 70b. Vanes 68, 68a, 68b can be made from any structural material like steel, aluminum, ceramics, or from plastic which has been injection molded.

FIG. 12b shows vanebody 72 which also can be made from aluminum, steel, ceramics, or plastic by injection molding. Vane body 72 has vane body pivot 90, 90a, 90b for their respective vane 68, 68a, 68b.

FIG. 12c shows vane 68. Vane 68 has two important features. The first is leading edge 92 which has the curvature of chamber 50, 50a. The second important feature of vane 68 is vane pivot 94. Every vane body pivot 90 encloses over 180 degrees of every vane pivot 94. This allows pivoting and maintains structural integrity.

FIG. 12d shows vane seal 70. Vane seal 70 is made from a flexible material as rubber or plastic and has a series of angled ridges on its outer radii. If necessary, these slanted ridges can cover the entire outer radii of vane 68 and the outer radii of vane body 72. Besides injection molding vane seal 70 can be fastened to vane 68 by adhesion or by mechanical means.

FIG. 12c shows vane spring 66 which is made from spring steel wire and in its non-tensioned state forms a right angle.

Operation of Invention

In the operation section the letter suffixes of similar parts will not be used. This is because all similar parts have the same operation. Only chamber 50 and its component parts will be discussed in detail. These components are the same as in chamber 50a.

Pump Operation

The present invention employs an improved hydraulic operating system. The heart of this system is pump 18. Pump 18 allows drive ratios to be changed hydraulically (like a transmission). Pump 18 also functions like a differential on cars. This differential function provides for safe cornering and allows the present invention to have positive traction rear drive.

Pump 18 is operated by foot pedals which rotate crankshaft 20 counterclockwise. Crankshaft 20 operates the components in both chamber 50 and 50a. Chamber 50 and 50a constitute two independent hydraulic systems. One system to each rear wheel.

Pump 18 has two features which control fluctuations in pedaling. The first is positioning the components of pump 18, 60 degrees out of phase. That is, chamber 50 starts pumping 60 degrees before chamber 50a starts pumping.

The second feature is vane 68 operation. The three vanes 68 provide continuous hydraulic pressure. At any time, one vane 68 is in the pressure mode. One vane 68 is leaving the pressure mode. One vane 68 is coming up to the pressure mode. When vane 68 is in the pressure mode it is also in the draw mode. The draw mode is where vane 68 is drawing in fluid. This draw (suction) brings in fluid for the next pressure cycle.

As crankshaft 20 is rotated, vane springs 66 push vane 68 slightly open. The draw of the pressurizing vane 68 opens the next vane 68 further. The draw cycle controls the pressure cycle. The pressure and draw cycle of the next vane 68 begin when the previous vane 68 crosses outlet 46. This cycle continues for the next vane 68.

Transmission Function

In the present invention, drive ratios are determined by hydraulic fluid volume ratios. These fluid volume ratios match one revolution of pump 18 to one revolution of the hydraulic motor on rear wheel 98. That is, pump 18 volume output and the volume of the hydraulic motor on the rear wheel. Volume control begins at the start of every power stroke, pedaling. In the power (pressurizing) stroke, some hydraulic fluid is forced through fluid passage 82 into cylindrical bore 84.

If this pressurized fluid has enough pressure to overcome spring 78, it moves piston 80. Piston 80 is pushed up until it contacts limiter 26. This fluid is momentarily stored in cylindrical bore 84. This storage of fluid causes a change in the output volume of pump 18. This feature allows pump 18 to have "variable volume".

When vane 68 slides past the fluid passage 82 there is a pressure drop. The front of vane 68 is pressurizing the fluid while the back side vane 68 is drawing in fluid for the next vane 68. With this drop in pressure, spring 78 pushes piston 80 back to its down position. This forces the fluid back to chamber 50, to the draw side of vane 68.

Limiter 26 controls the amount of fluid temporarily stored in cylindrical bore 84. If limiter 26 is turned up, more fluid is stored and the fluid output of pump 18 is less. This decrease in fluid volume lowers the drive ratio of the pump. If limiter 26 is turned down allowing no movement of piston 80, the pump is in the highest gear.

As piston 80 travels up and down, vent 76 prevents the build up of any pressure. As fluid is stored in cylindrical bore 84 the hydraulic system has that much fluid removed from the system. Reservoir 74 allows the replacement of this temporarily displaced fluid. As piston 80 goes up, the fluid level in reservoir 74 goes down. Vent 76 accommodates these changes in volume by allowing air, or any fluid, to flow between cylindrical bore 84 and reservoir 74.

Hydraulic Sealing

During operation pump 18 maintains hydraulic pressure with several innovative pressure seals. As vane 68 develops pressure, there are several areas of possible fluid leakage. The first area is vane leading edge 92 on vane 68. Vane leading edge 92 has the same curvature as chamber 50. A machined surface and hydraulic pressure prevent fluid leakage between the wall of chamber 50 and leading edge 92. Vane leading edge 92 temporarily seals fluid passage 82 as it slides by.

Vane pivot 94 and vane body pivot 90 are a tight fit and this minimizes hydraulic fluid leakage. End seal assemblies 54 restrict leakage on either side of the vanes 68 and vane body 72. Slightly compressed cushion 58 forces sealing surface 56 tight against vanes 68, vane seals 70, and vane body 72. Vane body 72 positions end seal assemblies 54 so vanes 68 can slide across sealing surface 56 at minimum clearance.

The last area of leakage is where vane 68 is closed and in contact with the wall of chamber 50. Vane seals 70 maintain hydraulic pressure at this location. Vane seals 70 are flexible and when not compressed have a length (radius) which is greater than the radius of the cylindrical solid formed by vane body 72 and closed vanes 68. As vane body 72 rotates, the wall of chamber 50 forces vane 68 to the closed position. This compresses the angled ridges of vane seal 70. When compressed vane seals 70 form a tight seal with the wall of chamber 50. There will be enough of these flexible angled ridges to provide sealing.

Differential Function

Although the tricycle doesn't have an axle, it functions like a car with a differential. This function is performed by the pivoting vanes 68 and by the two separate hydraulic systems. As vane 68 travels past fluid passage 82 the remaining fluid is pushed out through outlet 46. The fluid is then pushed through the tubing/frame members 2. The frame carries the hydraulic fluid to a hydraulic motor 100 on the rear wheels. Other frame members carry the fluid back to inlet 42 on pump 18.

This hydraulic motor 100 on the rear wheel 98 must be a positive displacement type. It must function both as a motor or as a pump. Examples are internal gear, spur gear, and sliding vane motor/pumps.

This combination of pump 18 and a positive displacement hydraulic motor 100 produce the differential function. Chamber 50 operates one wheel 98, chamber 50a operates the other wheel 98. During cornering the outer radius wheel turns faster. This causes the hydraulic motor 100 on that rear wheel to start pumping hydraulic fluid. This back pressure pushes vane 68 down and allows the fluid to pass through pump 18. Consequently, the inner wheel in a turn is the only wheel providing forward motion. This consistency in turning makes the three wheeled bicycle feasible.

Because there are two independent hydraulic systems, the present invention has a "positive traction" rear drive. If one wheel loses traction, the other wheel will continue to turn.

Conclusion, Ramifications, and Scope of Invention

Thus the reader will see that pump 18 provides a reliable, lightweight, multi-functional device for operating a tricycle. Pump 18 functions like a differential and like a transmission. The functions of pump 18 make the hydraulic tricycle possible.

While my above description contains many specificities, these should not be construed as limitations on the scope of the invention, but rather as an exemplification of one preferred embodiment thereof. Many other variations are possible.

The underlying feature of pump 18 is that it is normally human operated. Pump 18 may operate golf carts, wheelchairs, boats, off-road bicycles, and aircraft. Pump 18 could be used by wind powered electrical generators. Pump 18 could function like a plain pump.

Accordingly, the scope of the invention should be determined not by the embodiments illustrated, but by the appended claims and their legal equivalents.

I claim:

1. A vehicle comprising:
   (a) at least two drive wheels;
   (b) a fluidic drive mechanism including a case defining two cylindrical chambers, an inlet into each said chamber, an outlet out from each said chamber, an elongate crankshaft rotatably attached to said case and extending sealingly through said chambers, a vane assembly located within each of said chambers and attached to said crankshaft for rotation therewith, and a first reservoir in fluid communication with each said chamber, said first reservoir having therein a piston movable within each said first reservoir for displacing fluid, a bias means for biasing said piston in a direction of bias, and a limiter for limiting the movement of said piston; and
   (c) wherein rotation of said crankshaft rotates said vane assemblies thereby generating fluid pressure within said chambers and when said fluid pressure is sufficient to overcome said bias means said piston moves opposite said direction of bias thereby moving fluid into said first reservoir and adjustment of said limiter increases and decreases the range of movement of said piston thereby decreasing and increasing, respectively, an amount of fluid communicated to each said outlet and to a respective fluid motor for conversion t mechanical power for rotating said wheels.

2. The vehicle of claim 1 wherein said drive mechanism further comprises a second reservoir vented to each said first reservoir and in fluid communication with each said chamber for venting fluid pressure in each said first reservoir when said piston moves opposite said direction of bias.

3. The vehicle of claim 1 wherein said drive mechanism further comprises fluid differential means for allowing one drive wheel to rotate faster than the other drive wheel.

4. The vehicle of claim 3 wherein each said vane assembly of said drive mechanism comprises a vane body and a plurality of vanes rotatably attached to said vane body for rotation between a closed position adjacent said body and open position away from said body and said differential means comprises said vanes rotating toward the closed position to allow fluid flow past said vanes when fluid pressure at said inlet is greater than fluid pressure at said outlet.

5. The vehicle of claim 1 wherein said vane assemblies are clocked 60 degrees relative to one another.

6. The vehicle of claim 1 wherein each said cylindrical chambers of said drive mechanism has a center of radius and said elongate crankshaft has a longitudinal axis that is parallel and offset from an axis through said center of radii.

7. A vehicle comprising:
   (a) at least two drive wheels; and
   (b) a fluid drive mechanism including a case defining two cylindrical chambers, an inlet into each said chamber, an outlet out from each said chamber, an elongate crankshaft rotatably attached to said case and extending sealingly through said chambers, a vane assembly located within each one of said chambers and attached to said crankshaft for rotation therewith, each vane assembly comprising a vane body and a plurality of vanes rotatably attached to said vane body and movable between a closed position adjacent said body and an open position away from said body;

(c) said fluidic drive mechanism including fluid differential means for allowing one drive wheel to rotate faster than the other drive wheel and for allowing said vanes to rotate toward the closed position allowing fluid flow past said vanes when fluid pressure at said inlet is greater than fluid pressure at said outlet;

(d) wherein rotation of said crankshaft rotates said vane assemblies thereby generating fluid pressure within said chambers, said fluid pressure is communicated to said outlets and to a fluid motor for conversion to mechanical power for rotating said wheels and rotation of either one of said drive wheels rotates said fluid motor thereby generating fluid pressure at one respective said inlet that is greater than fluid pressure at one respective said outlet thereby causing said differential means to permit fluid flow from said respective inlet to said respective outlet around one respective said vane assembly.

8. The vehicle of claim 7 wherein said drive mechanism further comprises transmission means for increasing and decreasing the fluid volume discharged through each said outlet for each revolution of said crankshaft, thereby increasing and decreasing a drive ratio defined as a ratio of rotations of said crankshaft to rotations of said drive wheels.

9. The vehicle of claim 7 wherein said transmission means of said drive mechanism comprises a reservoir in fluid communication with each said chamber, said reservoir having therein a piston movable within said reservoir, bias means for biasing said piston in a direction of bias, and a limiter for limiting the movement of said piston; whereby fluid pressure in said chamber can move said piston in a direction opposite said direction of bias thereby moving fluid into said reservoir and said bias means can move said piston in said direction of said bias thereby discharging fluid from said reservoir to said chamber, and adjustment of said limiter increases and decreases the range of movement of said piston thereby increasing and decreasing, respectively, an amount of fluid that said reservoir can accept and discharge thereby decreasing and increasing said drive ratio.

10. The vehicle of claim 7 wherein said vane assemblies of said drive mechanism are clocked 60 degrees relative to one another.

11. The vehicle of claim 7 wherein each said cylindrical chambers of said drive mechanism has a center of radius and said elongate crankshaft has a longitudinal axis that is parallel and offset from an axis through said center of radii.

12. The vehicle of claim 7 wherein said vanes of said vane assemblies include a leading edge that is sealingly adjacent an interior surface of said cylindrical chambers so that a fluid pressure differential can occur between said leading edge and a trailing surface of said vane.

13. A vehicle comprising:
(a) at least two drive wheels;
(b) a fluidic motor connected to each of said drive wheels; and (c) a fluid drive mechanism defining two cylindrical chambers, an inlet into each said chamber, an outlet out from each said chamber and a vane assembly located within each of said chambers and a rotatable crankshaft attached to both of said vane assemblies;

(d) said drive mechanism further comprising transmission means for increasing and decreasing the fluid volume discharged through said outlet for each revolution of said crankshaft, thereby increasing and decreasing a drive ratio defined as a ratio of rotations of said crankshaft to rotations of said drive wheels, said transmission means comprising a reservoir in fluid communication with each said chamber, each said reservoir having therein:
  (i) a piston movable within each said reservoir;
  (ii) bias means for biasing each said piston in a direction of bias; and
  (iii) a limiter for limiting the movement of each said piston;
  (iv) whereby fluid pressure in said chamber can move said piston in a direction opposite said direction of bias thereby moving fluid into said reservoir and said bias means can move said piston in said direction of bias thereby discharging fluid from said reservoir to said chamber, and adjustment of said limiter increases and decreases the range of movement of said piston thereby decreasing and increasing, respectively, an amount of fluid that said reservoir can accept and discharge thereby decreasing and increasing said drive ratio;

(e) wherein rotation of said crankshaft rotates said vane assemblies thereby generating fluid pressure within each of said chambers, said fluid pressure is communicated to said outlets and to the respective fluid motors for rotating respective said drive wheels.

14. A vehicle comprising:
(a) at least two drive wheels;
(b) a fluidic motor connected to each of said drive wheels; and
(c) a fluidic drive mechanism defining two cylindrical chambers, an inlet into each said chamber, an outlet out from each said chamber and a vane assembly located within each of said chambers and a rotatable crankshaft attached to both of said vane assemblies;

(d) said drive mechanism further comprising fluid differential means for allowing one drive wheel to rotate faster than the other drive wheel, wherein each said vane assembly comprises a vane body and a plurality of vanes rotatably attached to said vane body and rotatable between a closed position adjacent said vane body and an open position away from said vane and wherein said fluid differential means further is for rotation of said vanes in the open position toward the closed position allowing fluid flow past said vanes when fluid pressure at said inlet is greater than fluid pressure at said outlet;

(e) wherein rotation of said crankshaft rotates said vane assemblies thereby generating fluid pressure within each of said chambers, said fluid pressure is communicated to said outlets and to the respective fluid motors for rotating respective said drive wheels.

* * * * *

UNITED STATES PATENT AND TRADEMARK OFFICE
CERTIFICATE OF CORRECTION

Figure 1:
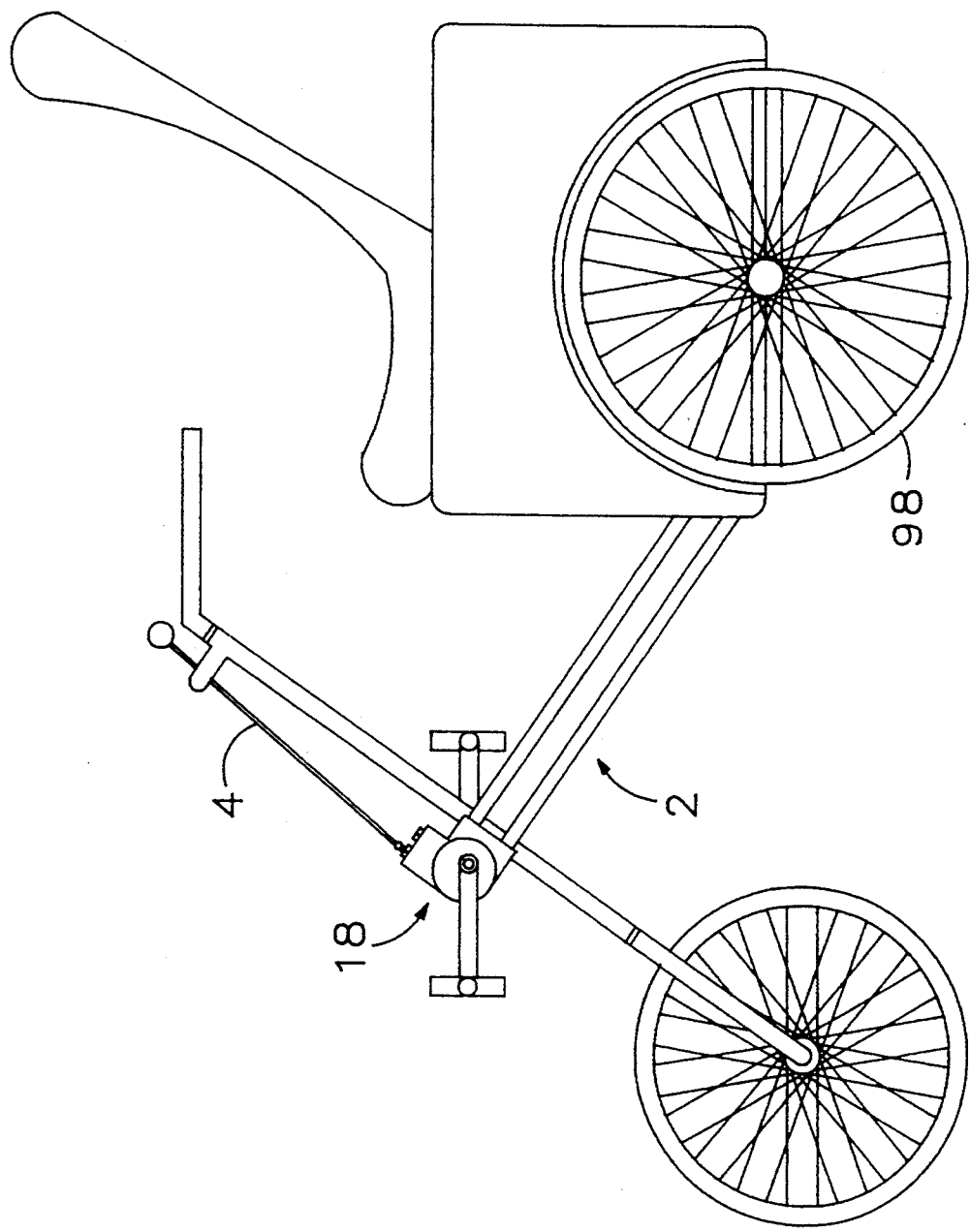
FIG. 1 shows a general description of pump 18 of the present invention and how the hydraulic drive system may appear on a cargo carrying tricycle.

PATENT NO. : 5,346,234
DATED : September 13, 1994
INVENTOR(S) : Thomas P. Kadaja It is certified that error appears in the above-indentified patent and that said Letters Patent is hereby corrected as shown below:

Column 2, Line 33: delete "FIG. 10" insert
-- FIG. 1 --

Column 5, Line 27: delete "vanebody" insert
-- vane body --

Column 8, Line 33: delete "t" insert -- to --

Column 10, Line 56: insert -- body -- after vane

Signed and Sealed this

Twenty-first Day of February, 1995

Attest:

BRUCE LEHMAN

Attesting Officer

Commissioner of Patents and Trademarks